US007210876B2

(12) United States Patent
Moralez et al.

(10) Patent No.: US 7,210,876 B2
(45) Date of Patent: May 1, 2007

(54) ROLLABLE LOAD BEARING MAT FOR TURF AREAS

(75) Inventors: Chris M. Moralez, Visalia, CA (US); Clifford P. Hammond, Lindsay, CA (US); Robert S. Juskalian, Visalia, CA (US); Arthur Villarreal, Fresno, CA (US)

(73) Assignee: National Diversified Sales, Inc., Lindsay, CA (US)

( * ) Notice: Subject to any disclaimer, the term of this patent is extended or adjusted under 35 U.S.C. 154(b) by 0 days.

(21) Appl. No.: 11/134,526

(22) Filed: May 20, 2005

(65) Prior Publication Data

US 2006/0263146 A1  Nov. 23, 2006

(51) Int. Cl.
*E01C 5/00* (2006.01)
*E01C 9/00* (2006.01)

(52) U.S. Cl. .............................. 404/36; 404/35; 404/41

(58) Field of Classification Search .................. 404/35, 404/36, 40
See application file for complete search history.

(56) References Cited

U.S. PATENT DOCUMENTS

| 70,076 A | 10/1867 | Dean |
| 1,071,091 A | 8/1913 | Rogers |
| 1,905,176 A | 4/1933 | Kieckhefer |
| 2,315,180 A | 3/1943 | Arthur |
| 2,315,448 A | 3/1943 | Nagin |
| 2,369,412 A | 2/1945 | Ruppel |
| 2,876,628 A | 3/1959 | Dixon |
| 2,899,775 A | 8/1959 | Partin |
| 2,912,910 A | 11/1959 | Wilson |
| 3,438,312 A | 4/1969 | Etal |
| 3,597,928 A | 8/1971 | Pilaar |
| 3,764,446 A * | 10/1973 | Martin ......................... 428/52 |
| 3,802,144 A * | 4/1974 | Spica ......................... 52/591.2 |
| 3,903,702 A | 9/1975 | Appleton |
| 3,960,375 A * | 6/1976 | Bibi-Roubi et al. .......... 472/92 |
| 3,990,247 A | 11/1976 | Palmer |
| 4,008,548 A | 2/1977 | Leclerc |
| 4,067,197 A | 1/1978 | Ritter |
| 4,111,585 A | 9/1978 | Mascaro |

(Continued)

OTHER PUBLICATIONS

NDS Landscape Product Catalog, Tufftrack Grassroad Pavers, May 2004, Cover and pp. 12-13, National Diversified Sales, Inc., U.S.

(Continued)

*Primary Examiner*—Gary S. Hartmann
(74) *Attorney, Agent, or Firm*—Richard A. Ryan

(57) ABSTRACT

A rollable load bearing mat for protecting turf areas from damage caused by weight bearing loads, such as vehicle or pedestrian traffic, configured from a plurality of interconnected mat units having a plurality of spaced apart cell rows comprising a plurality of generally upstanding tubular cell members. The cell members comprise a series of first cell members and adjoining second cell members that, in the preferred embodiment, share a common sidewall and are axially offset. The cell rows are interconnected by a plurality of flexible strap members configured to allow the mat unit to be rolled for ease of handling and installation. The cell member sidewalls and the flexible strap members are configured to provide a substantially open cell member to facilitate plant growth through the mat unit. Connecting mechanisms at the periphery of the mat unit connect with adjacent mat units to form a unitary load bearing mat.

39 Claims, 6 Drawing Sheets

U.S. PATENT DOCUMENTS

| | | | |
|---|---|---|---|
| 4,167,599 A * | 9/1979 | Nissinen | 428/44 |
| 4,329,392 A | 5/1982 | Bronner | |
| 4,584,221 A * | 4/1986 | Kung | 428/44 |
| 4,590,731 A * | 5/1986 | DeGooyer | 52/581 |
| 4,610,568 A | 9/1986 | Koerner | |
| 4,621,942 A | 11/1986 | Hill | |
| 4,671,699 A * | 6/1987 | Roach | 404/41 |
| 4,798,498 A | 1/1989 | Hallberg | |
| 5,102,048 A | 4/1992 | Bohnhoff | |
| 5,123,778 A | 6/1992 | Bohnhoff | |
| 5,250,340 A | 10/1993 | Bohnhoff | |
| 5,287,649 A * | 2/1994 | Prestele | 47/33 |
| 5,406,745 A * | 4/1995 | Lin | 47/1.01 F |
| 5,689,912 A * | 11/1997 | Prestele | 404/36 |

OTHER PUBLICATIONS

Grassroad Pavers Tufftrack Grass Paver, Technical Specification Guide, Jan. 2004, rev. 0104, National Diversified Sales, Inc., US.

* cited by examiner

ROLLABLE LOAD BEARING MAT FOR TURF AREAS

CROSS-REFERENCE TO RELATED APPLICATIONS

None.

BACKGROUND OF THE INVENTION

A. Field of the Invention

The field of the present invention relates generally to support mats configured to allow load bearing objects, such as a vehicle or pedestrian traffic to move over turf areas without significant compaction or other damage to the turf. More particularly, the present invention relates to such support mats that comprise a plurality of upstanding, open cell members configured for turf to grow through the mat. Even more particularly the present invention relates to such support mats that are rollable for ease of storage, delivery and installation.

B. Background

As well known to those in the turf and paving industries, there are numerous circumstances when it is necessary or desirable to be able to drive vehicles over turf areas, such as grassy or like areas, instead of the typical asphalt, concrete or other solid materials normally used as the load bearing material for roadways or vehicle pathways. Driving vehicles of any substantial weight or at any speeds other than at very low speeds over a turf area can easily result in substantial damage to the turf, particularly if the turf area is wet or configured with turf that is particularly susceptible to damage. Despite the potential for damage to the turf, driving vehicles over the turf occurs out of necessity when the turf area is used for temporary or overflow parking, to temporarily connect different parking areas and to permit temporary access across the turf to facilities or for various emergency situations. Allowing vehicles to drive over turf areas is desirable when, often for aesthetic purposes or to avoid interfering with the purpose of the turf area (i.e., golf courses), the owners or operators of the turf areas prefer to not have paths made up of the typical solid roadway materials cutting across the turf area, thereby dividing the turf area into disconnected segments. Examples of turf areas where the use of standard roadway materials are often not desired include golf cart paths, service roads through or overflow parking areas in parks and other park-like areas, residential driveways, emergency vehicle access lanes, grass air strips and the like. As well known, movement of vehicles across the turf can result in ruts in the turf, tearing of the turf and undesirable compaction of the turf and/or soil underneath that can inhibit or prevent normal turf growth.

To prevent damage to the turf from the movement of vehicles, such as cars, trucks, golf carts, emergency vehicles and other such vehicles, across or through the turf area it is common to utilize load bearing mats embedded or otherwise placed in or on the turf. Commonly, these load bearing mats are made up of a plurality of individual mat units and generally configured with a plurality of connected cell or cell-like members that are of sufficient strength to support the weight of the vehicle or other load bearing traffic as it moves over the turf. Many of the load bearing mats have cell members that are configured, at least to a certain extent, to allow the turf to grow through the load bearing mat and to allow water and other nutrients to reach the roots of the turf. The load bearing mats are typically placed in the turf or soil base just below the grade level of the turf so that conventional turf equipment, including lawnmowers and the like, can move over the turf and cut or treat the turf. To allow for different sizes of areas where load bearing mats are utilized, the typical load bearing mat is provided in modular mat units that can be selectively connected together to provide the desired amount of load bearing surface (i.e., parking lot sized area). The area enclosed by the cell members are filled with soil or other materials. In turf areas, the fill material preferably comprises that which facilitates the growth of turf through the load bearing mat. To facilitate gripping of the subsurface by the load bearing mat, drainage through the turf and oxygen transfer by the turf, it is generally desirable that the base of the individual cell members have as much opening as possible.

The use of load bearing mats to provide support in turf areas is not limited to use with areas where vehicles may move across or through the turf area. In addition, load bearing mats are also utilized in areas subject to heavy pedestrian or other non-vehicle load bearing traffic, such as for walking and/or bicycle paths through a park or park-like settings. Use of load bearing mats are also beneficially utilized on campus open areas where students are likely to cut across the turf and in areas around nursing homes or hospitals where persons may want to push another person in a wheelchair or use other equipment. Use of load bearing mats to prevent damage to turf is known to be particularly advantageous in areas where water or other fluids may commonly collect after watering or rain.

Examples of load bearing mats for use in turf areas can be found in numerous prior art patents. For instance, U.S. Pat. No. 4,621,942 to Hill describes a grass paving structure having a plurality of honeycombed, hexagon-shaped cells with upstanding sidewalls and a plurality of openings in the underlying base surface. In one configuration, as sold by National Diversified Sales, Inc. (the assignee of the present invention) under the name Tufftrack Grassroad Pavers, the load bearing members are sold in two foot by two foot interlocking sections that can be connected together to cover any size of area. A tongue and groove latching system provides quick and secure connections between the various sections. U.S. Pat. No. 4,111,585 to Mascaro describes a modular support mat for turfgrass areas that has a plurality of hexagonally shaped, adjoining cells that form a module of such cells. Individual modules are joined together by the use of selectively positioned integral projecting tabs having upstanding lugs thereon that are adapted to interlockingly engage a correspondingly located opening in an adjacent modular unit. U.S. Pat. No. 5,250,340 to Bohnhoff describes a mat for stabilizing particulate materials that comprises a planar quadrilateral grid formed by a plurality of intersecting struts having upstanding tubular members disposed on the grid in a rectangular array. This mat, sold as the Grasspave$^2$ by Invisible Structures, Inc. out of Golden, Colo., utilizes perpendicularly disposed struts that intersect at the bottom center of each tubular member and a socket/pin connector system to connect mats together to form a larger mat. The use of ribs between spaced apart tubular members allows the mat, or a series of interconnected mats, to be rolled. U.S. Pat. No. 5,102,048 to Bohnhoff describes a irrigation head support that includes a circular mat having a plurality of concentric circular ribs and radially disposed ribs with a centrally located circular aperture configured to receive an irrigation head and a plurality of upstanding tubular rings on the mat around the circular aperture. The tubular rings provide support for vehicle tires and other loads so as to avoid damage to the irrigation head. Grass roots grow through the spaces in the mat to secure the mat permanently in place.

The presently available load bearing mats generally comprise a plurality of cell or tubular shaped members that are configured in a generally honeycombed fashion, such as illustrated by U.S. Pat. No. 4,111,585 to Mascaro set forth above. These honeycombed configured mats obtain much of their load bearing strength due to the fact that the cell members share common sidewalls or, at a minimum, abutting sidewalls. While the interconnecting or abutting cell sidewalls provide strength for somewhat significant loads, the resulting load bearing mat must be configured from a plurality of individual generally rigid panels or mat units that are not very well adapted to being rolled. These flat panels are generally stored, transported and installed in their separate panel condition instead of a preferred rolled condition. As known to those skilled in the art, handling and installation of mats or mat-like structures such as load bearing mats is generally made significantly easier, faster and less expensive if the mat is provided in a rolled condition that can be unrolled into place where needed. As also set forth above, U.S. Pat. No. 5,250,340 to Bohnhoff describes a load bearing mat that comprises a plurality of cell members placed on at planar grid, thereby making it suitable for being provided in a rolled condition. In that configuration, however, the grid members that make up the grid cross at intersections located at or near the center of the cell members. The grids and intersection thereof at the center of the cell members somewhat reduces the amount of open area in the cell member that is available for horticultural purposes, namely the growth of turf or other plant material. While the rolled ability of this grid does provide installation labor and costs savings versus rigid panels, the loss of area available for plant growth is seen by many in the industry as a limitation to this type of load bearing unit.

The area to be covered by load bearing units is generally a variable that must be addressed by those who manufacture and supply load bearing mats. The typical manner in which this is addressed is by providing the load bearing mats in individual panels or mat units. To effectively cover the desired area, it is preferred that the individual panels be configured to lock together to form a substantially integral load bearing mat. The honeycomb configured load bearing mats typically utilize connecting mechanisms that connect cells of one panel to cells of an adjacent panel in an abutting relationship. During installation, the user connects these panels together to form the desired size of load bearing mat. With regard to load bearing mats provided in a rolled condition, a series of panels can be connected together to form a roll of such panels having a specified width. However, the connecting mechanism must be configured to allow and adapt to the rolling and unrolling of the mat. The mat described in U.S. Pat. No. 5,250,340 and sold by Invisible Structures, Inc. utilizes a pin and socket type of connecting mechanism that is configured in a generally vertical or axial manner. In use, this type of connecting mechanism can result in dimpling of the leveled planting base during installation and tends to unsnap during and after installation due to vertically applied loads. What is needed, therefore, is a rollable load bearing mat that is configured for use as a load bearing surface in turf areas that includes the use of interconnected cell members for mat strength, the ability to provide the mat in a rolled condition for ease of handling and installation, and the use of mat unit connectors that are suitable for rolling and which do not have the problems associated with vertically or axially configured pin and socket connectors.

SUMMARY OF THE INVENTION

The rollable load bearing mat for turf areas of the present invention solves the problems and provides the benefits identified above. That is to say, the present invention discloses a load bearing mat that includes a plurality of interconnected cell members that have one or more adjacent or integral side walls for improved load bearing strength to carry load bearing traffic over a turf area without substantial damage to the turf. In one preferred embodiment of the present invention, the cell members are generally tubular, hexagonally shaped cells which are provided in a plurality of cell rows with each pair of cell members being in an axially offset adjoining relationship. Individual rows of cell members are connected together by a plurality of selectively positioned elongated belts or straps to form an integral mat unit. This type of arrangement allows the cell members to be substantially completely open at the top and bottom surface of the mat unit for improved turf and other plant growth through the mat unit. The use of the flexible straps to connect the rows of cell members also allows the mat unit to be rolled for ease of handling and installation. Connectors at the periphery edges of the mat unit allow connection of one mat unit to another to form the desired load bearing mat of any length and width. To overcome the problems associated with presently available vertically or axially aligned pin and socket connectors, the preferred embodiment of the present invention utilizes laterally disposed connectors that are configured to substantially horizontally engage, in an interlocking manner, the correspondingly configured connectors on one or more adjacent mat units.

In one general aspect of the present invention, the rollable load bearing mat for turf areas and the like of the present invention is made up of a plurality of interconnected mat units, each having a generally planar bottom surface, a generally planar top surface, a first side, an opposing second side, a first end and an opposing second end. The mat unit comprises a plurality of spaced apart cell rows that each have a plurality of generally tubular cell members comprising a series of first cell members and adjoining second cell members. Each of the cell members has one or more generally upstanding sidewalls that is configured to form a substantially open bottom opening at the bottom surface and a substantially open top opening at the top surface. In the preferred embodiment, each of the first cell members are axially offset relative to each of the second cell members and the first cell members and second cell members share a common sidewall for increased strength. The plurality of cell rows comprises a first side row at the first side of the mat unit, a second side row at the second side of the mat unit and one or more interior cell rows disposed between the first side row and the second side row. The individual cell rows are interconnected by a plurality of generally flexible linking members that are configured to allow the mat unit to be placed in a generally rolled condition for ease of handling and installation. Connecting mechanisms are located at the periphery edges of the mat unit to connect it with one or more cooperatively configured mat units. In a preferred configuration, the connecting mechanisms comprise a plurality of interlocking members in corresponding relation with cooperatively configured adjacent connecting means on a peripheral edge of the adjacent mat unit for complimentary interlocking engagement therewith. Also in the preferred configuration, the interlocking members are laterally disposed to provide a more secure connection (i.e., one that will not disconnect due to vertical loading on the mat unit). The interlocking members can comprise a plurality of selectively positioned projecting members and a plurality of selectively positioned open members that are positioned and configured to receive the projecting members in interlocking relation. In the preferred embodiment, the projecting members comprise a lateral snap lock and each of the open members comprises a lateral snap lock receiving member having a lateral snap lock receiving opening, both of which are configured for generally horizontal engagement thereof. To facilitate rolling of the mat unit, the lateral snap locks at the first and second sides of the mat unit can be disposed on an flexible, elongated connecting strap. The interlocking members at the first and second ends of the mat unit are configured to connect the mat unit to adjacent mat units in a substantially abutting relation thereto.

Accordingly, the primary objective of the present invention is to provide a rollable load bearing mat that provides the advantages discussed above and that overcomes the disadvantages and limitations associated with presently available load bearing mats.

It is also an object of the present invention to provide a rollable load bearing mat for use in turf areas and the like that comprises a plurality of interconnected cell members having one or more abutting or integral sidewalls for improved load bearing strength.

It is also an object of the present invention to provide a rollable load bearing mat for turf areas that comprises a plurality of cell members that are substantially open at the top and bottom surfaces of the mat.

It is also an object of the present invention to provide a rollable load bearing mat for use in turf areas and the like that is configured with a plurality of flexible strap or strap-like members that interconnect pairs of rows comprised of a plurality of open cell members to permit the mat to be rolled for ease of handling and installation.

It is also an object of the present invention to provide a rollable load bearing mat for turf areas that utilizes laterally disposed connectors which are configured to substantially horizontally engage, in an interlocking manner, the correspondingly configured connectors on one or more adjacent mat units.

It is also an object of the present invention to provide a rollable load bearing mat for turf areas made up of a mat units that comprise a plurality of rows of interconnected, substantially open cell members with the rows of cells being connected by flexible strap members to facilitate rolling and unrolling the mat and which comprises connectors at the periphery of the mat unit that are configured to lockingly engage the connectors of one or more adjacent mat units.

The above and other objectives of the present invention will be explained in greater detail by reference to the attached figures and the description of the preferred embodiment which follows. As set forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the rollable load bearing mat for turf and other areas of the present invention illustrated in the figures, various preferred embodiments of the present invention are set forth below. The enclosed description and drawings are merely illustrative of preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
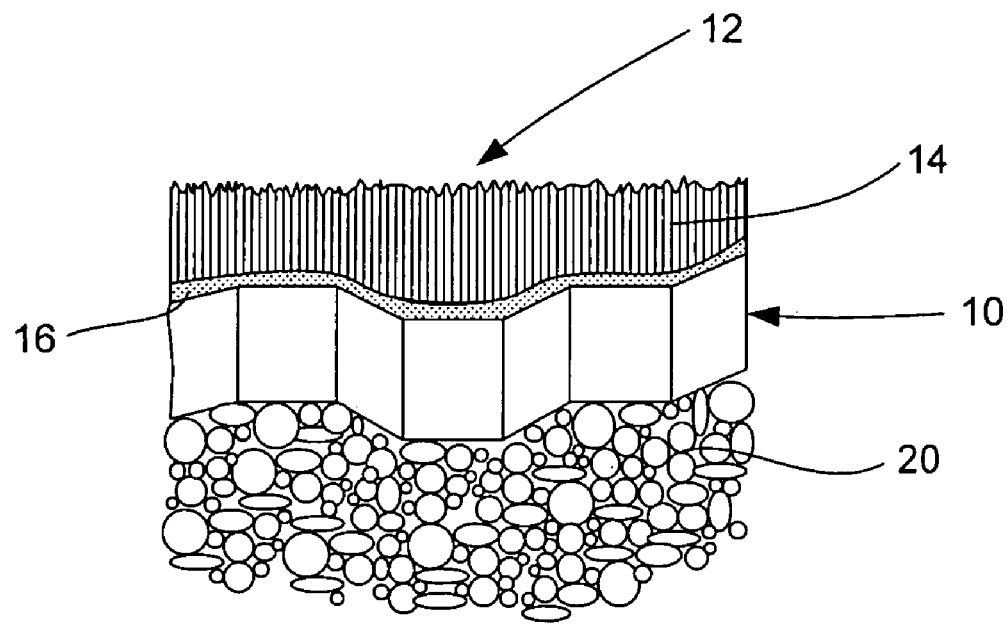
FIG. 1 is a side view of the cross-section of a typical installation of the rollable load bearing mat according to a preferred embodiment of the present invention for use in a turf area subject to relatively heavy loading.
Figure 4:
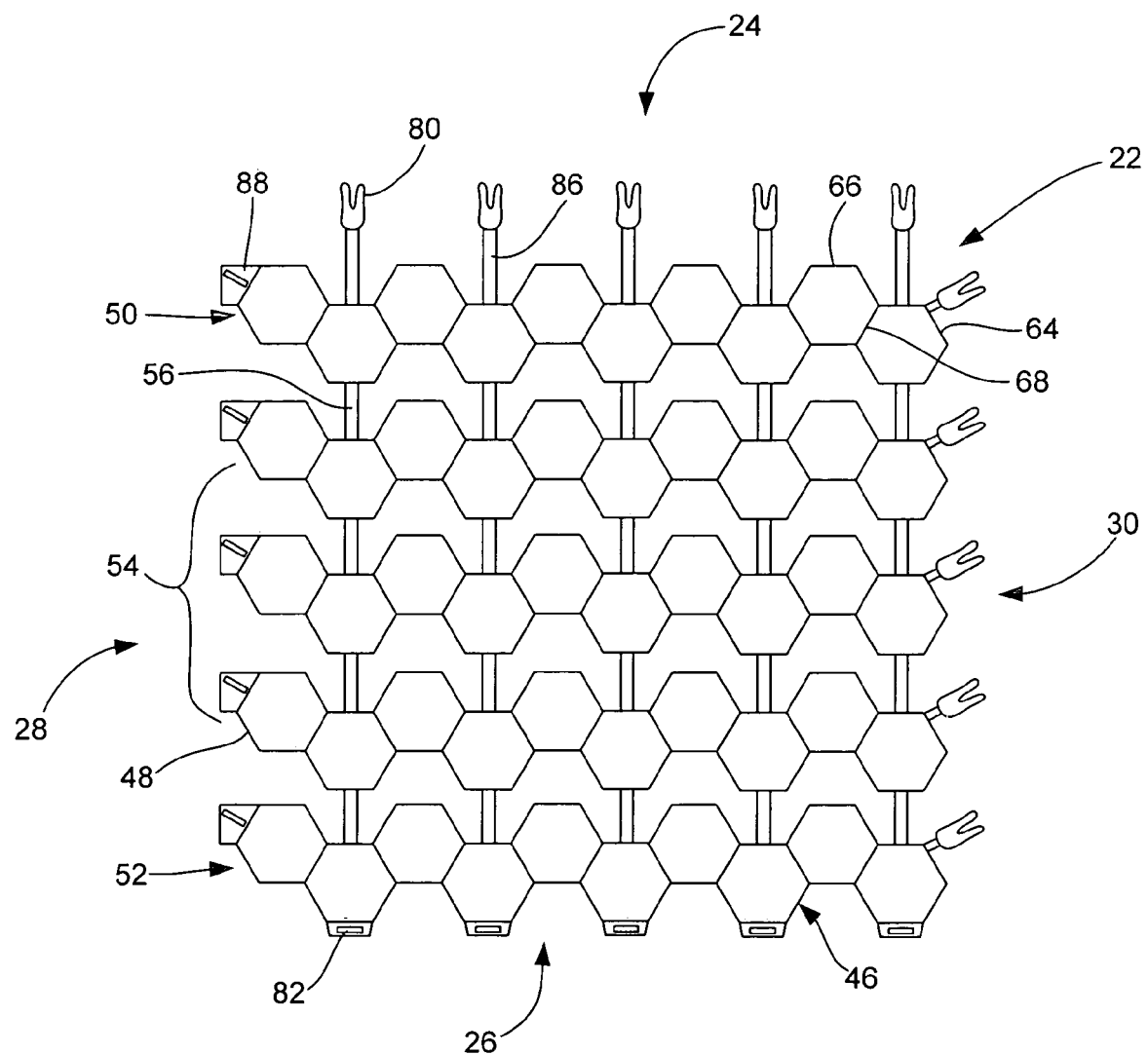
FIG. 4 is a top plan view of an individual mat unit configured according to a preferred embodiment of the present invention showing the use of projecting members at the first side and second end and the use of open members at the first end and second side thereof.

The preferred embodiment of the rollable load bearing mat of the present invention, shown in the figures and identified generally as 10, is best shown in FIG. 4. As explained in more detail below and shown installed in FIG. 1, load bearing mat 10 can be utilized in a turf area 12 to provide support for the use of load bearing objects over turf area 12 without damage to turf 14. The installation shown in FIG. 1, which is somewhat typical for turf areas 12 having heavy loading or for use as a firelane access, comprises turf 14 planted in sod 16 and sub-base 20 supporting load bearing mat 10. As known to those skilled in the art, use of load bearing mat 10 in turf areas 12 generally requires preparation of the selected area to provide the proper sub-base 20 prior to installation of load bearing mat 10. Once installed, vehicles and/or other load bearing objects can travel across turf area 12 with little or no damage to turf 14, which can be watered, mowed and otherwise generally treated as normal areas of turf (typically excluding a few activities such as aeration and the like that may penetrate or otherwise damage load bearing mat 10).

Figure 3:
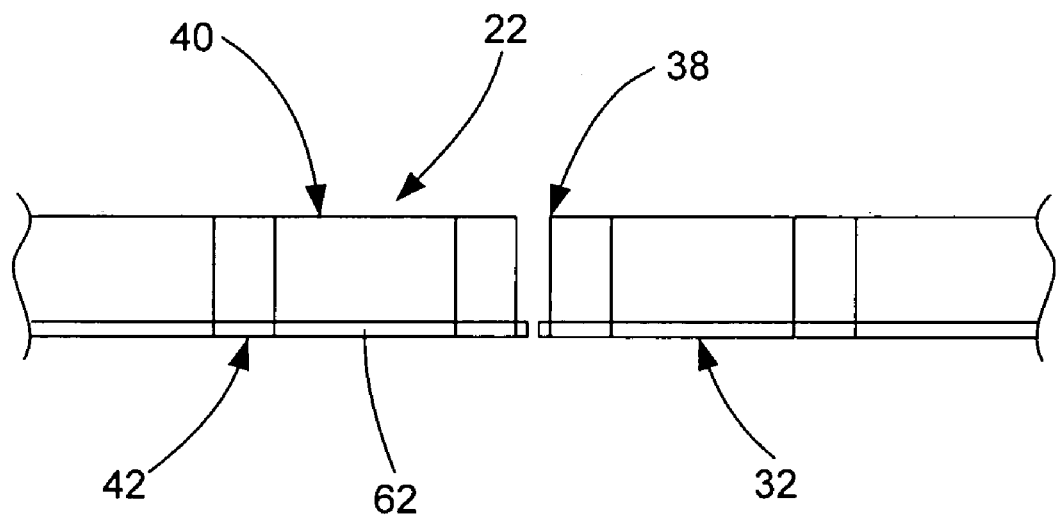
FIG. 3 is a side view of a mat unit and an adjacent mat unit configured according to a preferred embodiment of the present invention.
Figure 2:
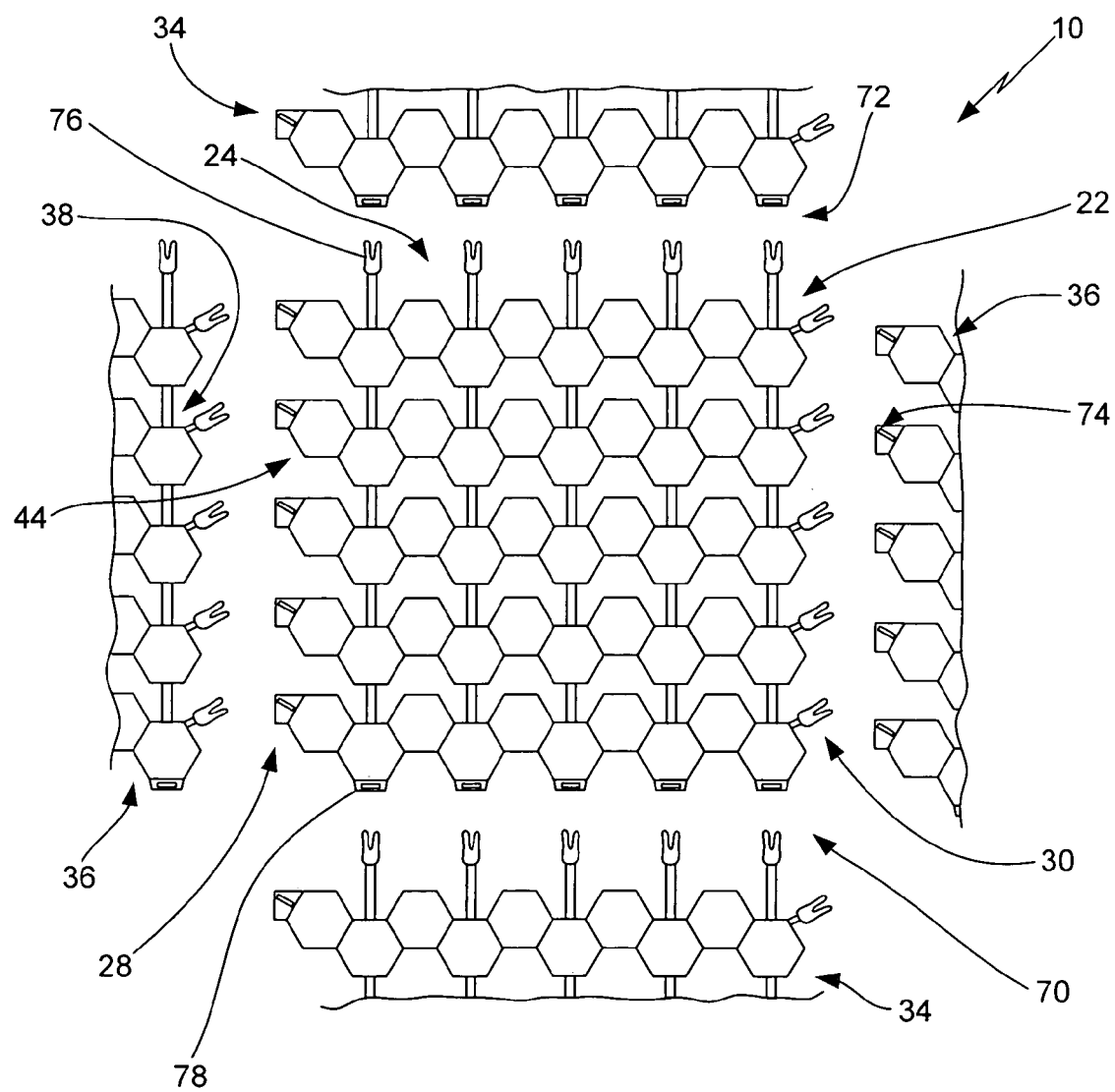
FIG. 2 is a top plan view of a mat unit configured according to a preferred embodiment of the present invention shown with a plurality of adjacent mat units utilized to form a larger load bearing mat.

As shown in FIGS. 2 and 4, load bearing mat 10 is provided in individual mat units 22 having a first side 24, an opposing second side 26, a first end 28 and an opposing second end 30 that are configured to connect to one or more adjacent mat units (identified generally as 32 in FIG. 3), which can include one or more side disposed units 34 and/or one or more end disposed units 36. As explained in more detail below, mat unit 22 interlockingly connects to adjacent units 32 at the periphery edge 38 of adjacent unit 32 (FIG. 3), such as end disposed unit 36 (FIG. 2). In the preferred embodiment of the load bearing mat 10 of the present invention, as shown in FIG. 3, mat unit 22 has a generally planar top surface 40 over which the vehicle and other load bearing objects will travel and a generally planar bottom surface 42 which will rest on the base 18, sub-base 20 or other prepared surface for load bearing mat 10. As known to those skilled in the art, the number of mat units 22 necessary to properly cover a certain turf area 12 is dependent on the length and width dimensions of turf area 12 and the length and width dimensions of a single mat unit 22. For areas larger than a single mat unit 22, which is typical, mat unit 22 is connected to one or more side disposed units 34 for increased length and is connected to one or more end disposed units 36 for increased width. As also known to those skilled in the art, for turf areas 12 less than a single mat unit 22 or less than a whole number of additional side disposed units 34 and/or end disposed units 36, the user can cut mat unit 22, side disposed unit 34 and/or end disposed unit 36 to the appropriate size utilizing cutting equipment appropriate for the materials utilized for such units.

With reference to the single mat unit 22 of FIGS. 2 and 4, mat unit 22 comprises a plurality of spaced apart cell rows 44 each containing a plurality of generally tubular cell members 46 having one or more generally upstanding sidewalls 48, depending on the cross-section of cell member 46. In a preferred configuration, cell member 46 is hexagonally shaped. Sidewalls 48 of cell member 46 should be configured to be sufficiently rigid to safely and effectively support the loads desired to be supported by load bearing mat 10 (i.e., vehicle versus pedestrian traffic loads). Although the hexagon shape shown in the figures is a preferred configuration for cell members 46, those skilled in the art will recognize that the invention is not so limited. Cell members 46 can be generally circular, square, rectangular, octagon or any of a variety of other configurations desired or preferred depending on factors such as strength, ease of manufacturing and aesthetics.

In a preferred embodiment of the present invention, best shown in FIG. 4, cell rows 44 of mat unit 22 are generally parallel to each other and comprise at least first side row 50 at first side 24 of mat unit 22, second side row 52 at second side 26 of mat unit 22 and at least one interior row 54 disposed between first side row 52 and second side row 54. The preferred embodiment of mat unit 22 comprises a plurality of interior rows 54, as shown in FIG. 4. As known to those skilled in the art, the number of cell rows 44 for a particular mat unit 22 will depend on the overall size of mat unit 22, the size of cell members 46 and the distance between the spaced apart cell rows 44. Interconnecting the various cell rows 44 of mat unit 22 are a plurality of generally flexible linking members 56, which in a preferred configuration are elongated strap or strap-like members. If mat unit 22 only comprises first side row 50 and second side row 52, linking members 56 interconnect first side row 50 to second side row 52. In the preferred embodiment, wherein mat unit 22 comprises one or more interior rows 54, linking members 56 are utilized to interconnect first side row 50 to an interior row 54, interconnect two interior rows 54 and connect an interior row 54 to second side row 52, as shown in FIG. 4. Linking members 56 should be sized and configured to be sufficiently flexible to allow mat unit 22 and a plurality of mat units 22 to be placed in a rolled condition, shown as 55 in FIG. 5. Like a tractor tread type of configuration, mat unit 22 comprising a plurality of cell rows 44 interconnected by appropriately configured linking members 56 will allow mat unit 22 to be rolled for storage and transportation and then unrolled for ease of installation. In one preferred configuration, shown in the figures, linking members 56 are approximately one and one-half inches long, have a generally rectangular cross-section and connect at or near the bottom of cell members 46. Although mat unit 22 can be configured in a number of different manners, the preferred method of manufacture is an injection molding process that forms mat unit 22, with cell rows 44, cell members 46 and linking members 56, as a single integral unit out of a thermoplastic material, such as high density polyethylene (HDPE).

Figure 9:
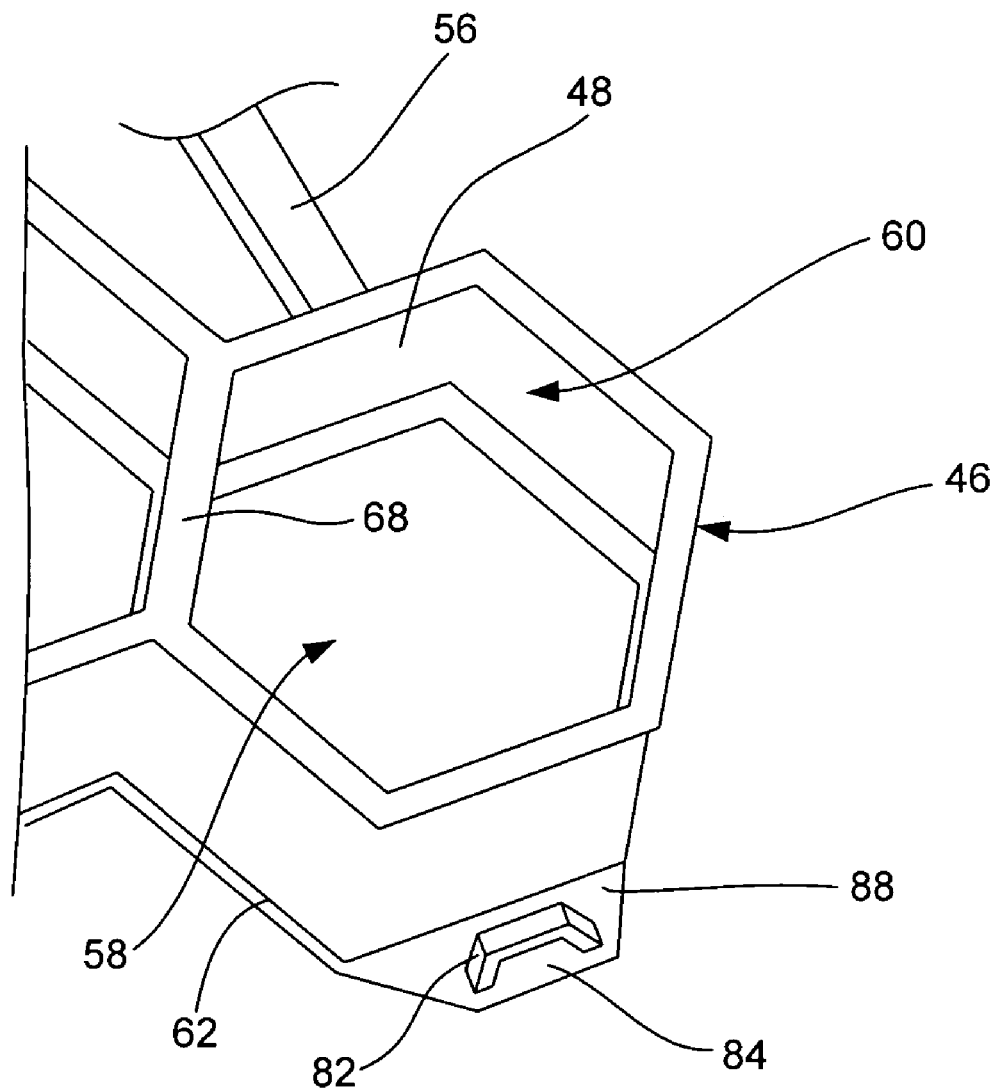
FIG. 9 is an isolated top perspective view of a cell member configured according to a preferred embodiment of the present invention.

In the preferred embodiment, as best shown in FIG. 9, cell members 46 have generally upstanding sidewalls 48 configured to provide a substantially open bottom opening 58 at bottom surface 42 and a substantially open top opening 60 at top surface 40. The configuration of linking members 56 described above is preferably selected so as to not interfere or otherwise intrude into the open cell members 46. The substantially open cell members 46 through bottom opening 58 and top opening 60 provides substantial horticultural benefit with the use of load bearing mat 10 of the present invention, which has not heretofore been available in rollable load bearing mats 10. The area between the spaced apart cell rows 44 provides additional open area, contributing further to the horticultural benefit of load bearing mat 10. As known in the art, the open areas within mat unit 22 facilitates turf 14 or other plant root development and improves the ability of the turf system to transfer water and oxygen, as desired for healthy turf 14. Unlike other rolled load bearing mat systems, cell members 44 have substantially 100 percent of the cell available for these benefits. In addition to providing various known horticultural benefits, the improved root development and turf composition also improves the ability of the system to hold load bearing mat 10 in place so as to resist lateral movement of load bearing mat 10. In a preferred embodiment of the present invention, cell members 46 have a cell base 62 that is slightly enlarged relative to upstanding sidewalls 48 to provide a wider footprint for greater stability and improved load transfer, as best shown in FIG. 9.

Figure 6:
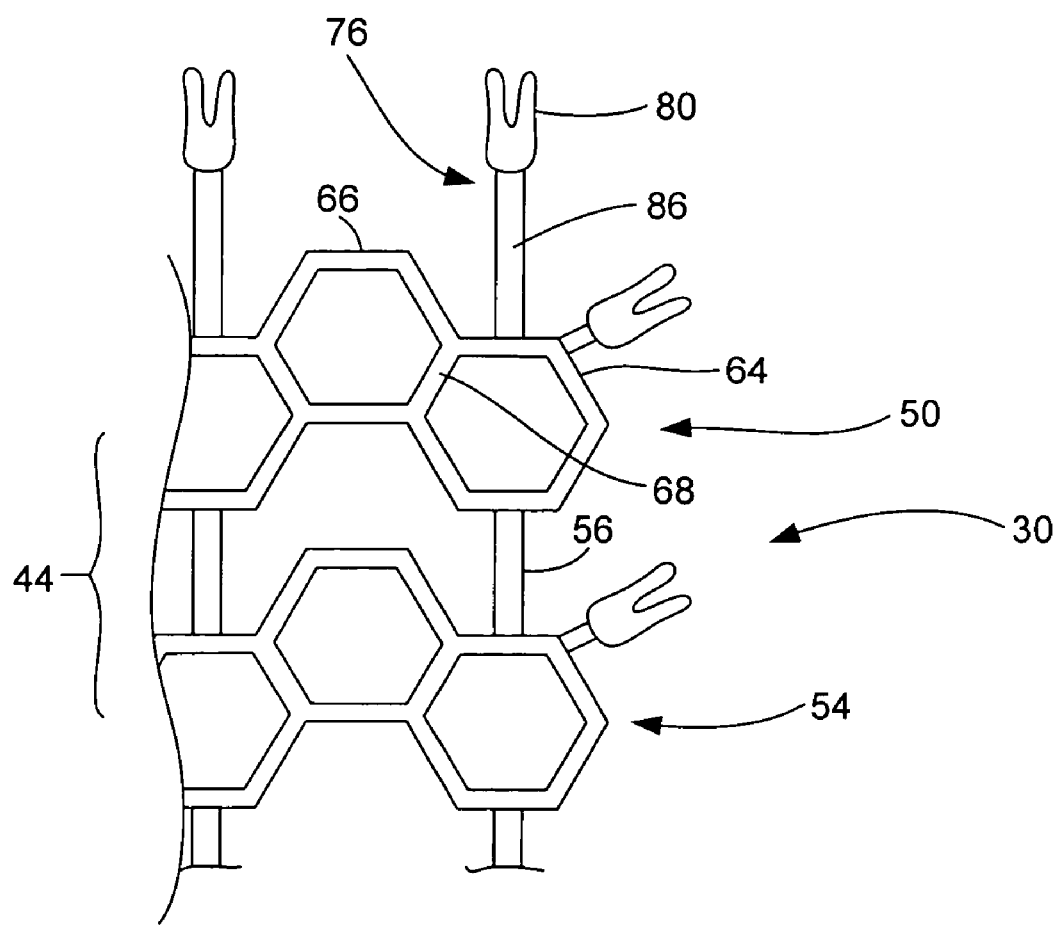
FIG. 6 is a top plan view of an isolated section of a mat unit configured according to a preferred embodiment of the present invention showing the use of projecting members at the first side and second end thereof.
Figure 7:
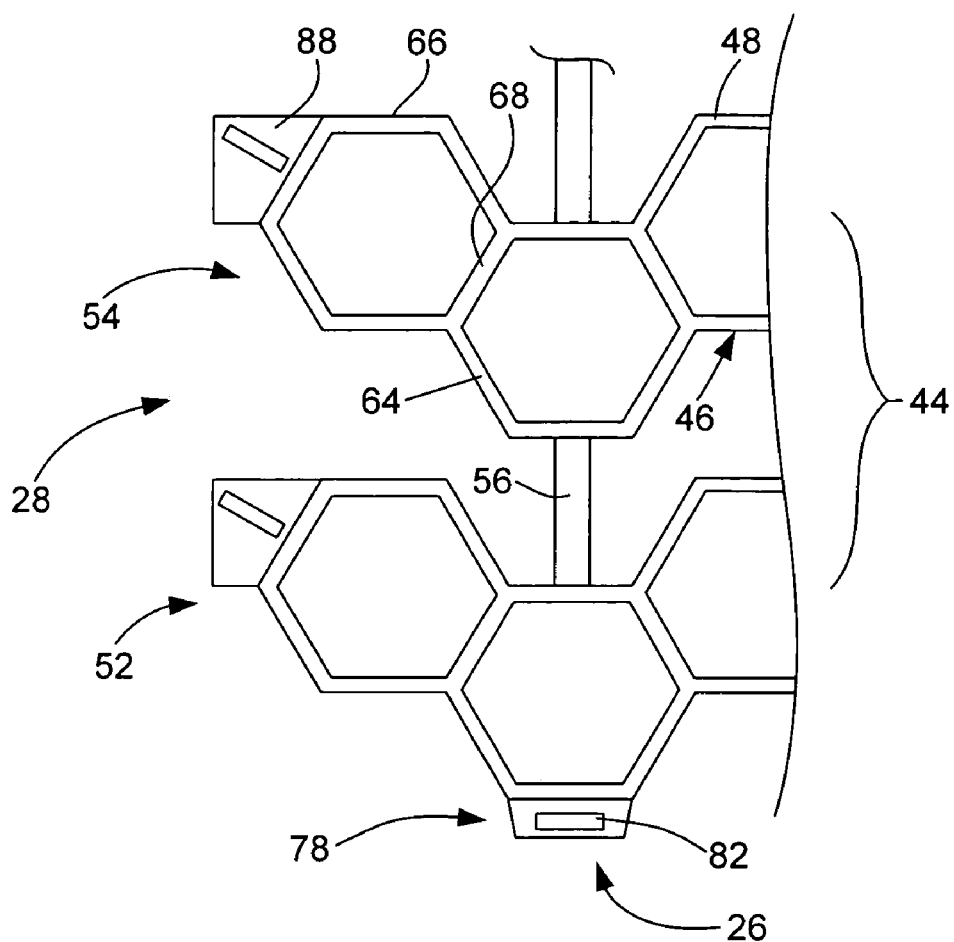
FIG. 7 is a top plan view of an isolated section of a mat unit configured according to a preferred embodiment of the present invention showing the use of open members at the first end and second side thereof.

As shown in the figures, the preferred embodiment of the present invention also utilizes cell rows 44 comprised of a series of first cell member 64 and adjoining second cell member 66 in an axially offset and a common sidewall 68 configuration to provide improved strength for mat unit 22. As best shown in FIGS. 6 and 7, the longitudinal axis of second cell member 66 is axially offset relative to first cell member 64, as opposed to the longitudinal axis of each cell member 64 and 66 being aligned linearly (i.e., in a straight row). As will be appreciated by those skilled in the art, a linear alignment of the axis of each first cell member 64 with each second cell member 66, resulting in linear rows of cell members 46, would result in a series of rows of cell members 46 and rows of open spaces between cell rows 44.

In the preferred configuration, only the axis of each of the first cell members 64 are aligned linearly and the axis of each of the second cell members 66 are aligned linearly. This configuration provides a generally equal, but offset, spacing between cell rows 44, resulting in the zig zag type of configuration shown in the figures that avoids the support issues that would be associated with rows of open spaces between cell rows 44. To provide improved structural strength for mat unit 44, each of the first cell members 64 shares a common sidewall 68 with a second cell member 66. Although first cell member 64 and second cell member 66 can be formed as separate complete cell members 46 that have an abutting sidewall, the use of an integral common sidewall 68 provides a more structurally sound mat unit 22 and simplifies the preferred method of manufacture, which is injection molding. In the hexagon cell member 46 configuration shown in the figures, one of the hexagon segment sidewalls 48 provides both the axial offset and common sidewall 68 configuration of the present invention.

Figure 8:
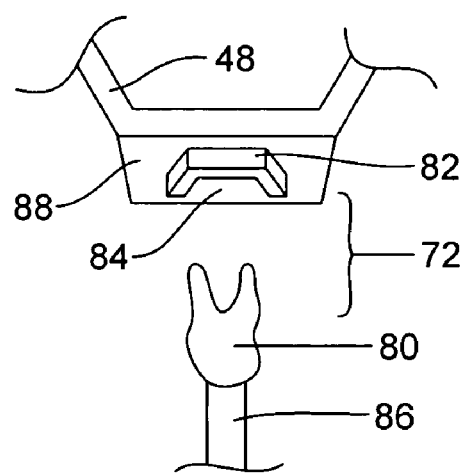
FIG. 8 is an isolated top perspective view of the interlocking members utilized with a preferred embodiment of the present invention.

To facilitate joining a plurality of mat units 22 together to form a load bearing mat 10 of sufficient size to protect a turf area 12 of any desired size and shape, mat unit 22 and adjacent mat units 32 are provided with cooperatively configured connecting mechanisms. As best shown in FIGS. 6 through 8, connecting mechanism 70 on mat unit 22 comprises a plurality of interlocking members, illustrated individually as 72, that are in corresponding relation, as to size, shape and position, with adjacent connecting mechanism 74 on peripheral edge 38 of adjacent mat units 32, as shown in FIG. 2 with regard to side disposed units 34 and end disposed units 36. Although many of the connectors utilized in the prior art can be adapted for use with the load bearing mat 10 of the present invention, the preferred connecting mechanism 70 has laterally disposed interlocking members 72 located at the outer edges of mat unit 22. Laterally disposed interlocking members 72 are preferred over vertical or axial fastening systems, such as the pin and lock mechanism set forth in U.S. Pat. No. 5,250,340 to Bohnhoff, due to the potential for dimpling of the leveled planting base 18 during installation of load bearing mat 10 and a tendency of vertical/axial fasteners to unsnap during and after installation due to vertically applied loads on load bearing mat 10. Lateral or horizontally configured interlocking members 72, particularly configured as described below, reduces or virtually eliminates such problems. Until the present invention, lateral interlocking members 72 have not been utilized with load bearing mats that are configured to be rolled for ease of handling and installation.

As known to those skilled in the art, it is preferred that each mat unit 22 be configured with both halves of interlocking members 72 at alternative sides and ends of mat unit 22 so that mat unit 22 can be connected to side disposed units 34 at first 24 and second 26 sides and to end disposed units 36 at first 28 and second 30 ends thereof. In one embodiment, the plurality of interlocking members 72 comprises a plurality of selectively positioned projecting members 76 that are configured to be engagedly received by a plurality of selectively positioned open members 78. To achieve the desired connection between mat unit 22 and adjacent mat units 32, the projecting members 76 and open members 78 are cooperatively positioned, as shown in FIG. 2, on the sides 24/26 and ends 28/30 of mat unit 22. As best shown in FIG. 8, in the preferred embodiment projecting members 76 comprise a lateral snap lock 80 and open members 78 comprise a lateral snap lock receiving member 82 having a lateral snap lock receiving opening 84 sized and configured to provide interlocking engagement between mat unit 22 and one or more adjacent mat units 32. Lateral snap lock 80 is of the type that is configured to lock into position inside lateral snap lock receiving member 82 through lateral snap lock receiving opening 84. As set forth above, it is preferred that lateral snap lock 80 and lateral snap lock receiving opening 84 be laterally disposed to avoid problems associated with vertical or axially disposed connectors.

Figure 5:
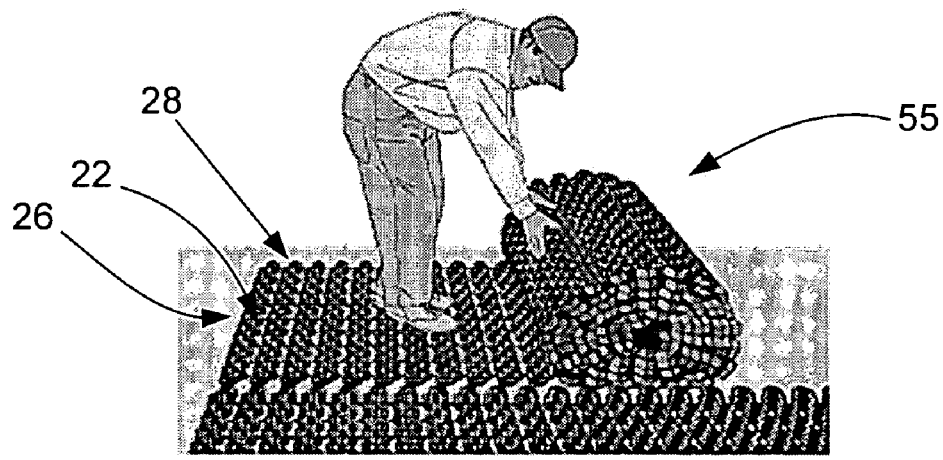
FIG. 5 is a side perspective view of the load bearing mat of the present invention shown in a rolled condition.

In the preferred embodiment, the projecting member 76 portion of connecting mechanism 70 located at the sides of mat unit 22 is configured slightly different than that at the ends of mat unit 22, as shown in FIGS. 6 and 7. The interlocking members 72 of connecting mechanism 70 at first side 24 and second side 26 are configured to connect to one or more cooperatively configured side disposed units 34 in a manner that permits somewhat contiguous rolling of mat unit 22 and side disposed units 34 into a single roll, as shown in FIG. 5. In the preferred embodiment, shown in FIG. 6, this is accomplished by providing a lateral snap lock 80 on an elongated connecting strap 86 that extends generally outwardly from first side 24 of mat unit 22 to engage a lateral snap lock receiving member 82 integral with a base extension 88 on an adjacent side disposed unit 34. A cooperatively configured lateral snap lock receiving member 82, on a base extension 88, having a lateral snap lock receiving opening 84 therein, as best shown in FIG. 8, is located at the second side 26 of mat unit and is configured to receive lateral snap lock 80 connected to a connecting strap 86 associated with a side disposed unit 34. As described above, both lateral snap lock 80 and lateral snap lock receiving opening 84 are configured for interlocking engagement with cooperatively configured interlocking members 72 located on an adjacent side disposed unit 34. Use of connecting strap 86, which is preferably configured the same as linking member 56 described above, allows mat unit 22 to be rolled in the first side 24 to second side 26 direction. In contrast, interlocking members 72 located at first end 28 and second end 30 are configured to connect to one or more end disposed units 36 in a substantially abutting relation. As shown on FIGS. 6 and 7, the preferred embodiment of the present invention utilizes the same lateral snap lock 80 and lateral snap lock receiving member 82 described above, except without connecting strap 86 as mat unit 22 is not configured to roll in the first end 28 to second end 30 direction. In a preferred embodiment, lateral snap lock receiving member 82 is integral with a base extension 88 at first end 28 of mat unit 22.

In one commercial embodiment of the present invention, mat unit 22 is configured to be approximately a square of twenty inches by twenty inches or forty inches by forty inches having cell members 46 approximately one and one-half inches deep and two and three-eighths inches across with approximately one inch between cell rows 44. Preferred materials for mat unit 22 include high density polyethylene (HDPE). As known in the art, to install load bearing mat 10, the existing turf (if any) is removed and the area desired for load bearing mat 10 is excavated to a depth sufficient to allow the placement of sub-base 20, to the extent such material is necessary. Once any improved sub-base 20 is placed, as necessary, in the excavated area, a plurality of mat units 22 are rolled out and placed in interlocking relation and arranged so as to cover the entire length and width of the excavated area, providing a substantially unitary load bearing mat 10. Once mat units 22 are in place, an appropriate soil material, such as a sandy loam or loam soil mixed as appropriate for the particular region, is placed so as to fill the empty cell members 46 and the open spaces between cell rows 44. Generally, a turf/sod combination material is placed over the soil-filled cell members 46 and allowed to establish itself over the load bearing mat 10. As the turf 14 grows, the roots extend downward through mat units 22 to more fully secure it in place. Water and nutrients will flow through turf 14 and mat units 22 to reach the roots of turf 14. When the turf 14 is fully established, load bearing mat 10 will be generally securely bound in place. Any weight bearing loads that cross over turf area 12 protected by load bearing mat 10 will be effectively transferred by the upstanding sidewalls 48 of cell members 44 to cell base 62 and then to be distributed to sub-base 20 below, thereby preventing compaction or other damage to turf 14. Because the load bearing mat 10 is below the level of the sod, the turf 14 can be mowed in the usual manner with conventional equipment.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to assembly, materials, size, shape and use.

What is claimed is:

1. A load bearing mat, comprising:
   a mat unit having a bottom surface, a top surface, a first side, an opposing second side, a first end and an opposing second end;
   a plurality of spaced apart cell rows disposed in said mat unit, each of said plurality of cell rows having a plurality of generally tubular cell members, said plurality of cell members comprising a series of a first cell member and an adjoining second cell member, each of said cell members having one or more generally upstanding sidewalls, each of said first cell members axially offset relative to each of said second cell members, said plurality of cell rows comprising at least a first side row at said first side of said mat unit and a second side row at said second side of said mat unit;
   a plurality of generally flexible linking members interconnecting said first side row and said second side row, said linking members configured to allow said mat unit to be placed in a generally rolled condition; and
   means at each of said first side, said second side, said first end and said second end for connecting said mat unit to one or more adjacent mat units, said connecting means configured for complimentary interlocking engagement of said mat unit with said one or more adjacent mat units.

2. The load bearing mat according to claim 1, wherein said bottom surface is generally planar and said top surface is generally planar.

3. The load bearing mat according to claim 1, wherein said sidewalls of each of said cell members form a substantially open bottom opening at said bottom surface and a substantially open top opening at said top surface, said linking members configured so as to not intrude into the interior area of said tubular cell members.

4. The load bearing mat according to claim 1, wherein each of said first cell members and said second cell members share a common sidewall.

5. The load bearing mat according to claim 1, wherein said first side row and said second side row are substantially parallel.

6. The load bearing mat according to claim 1, wherein said linking member is an elongated strap.

7. The load bearing mat according to claim 1, wherein said plurality of cell rows further comprises one or more interior cell rows disposed between said first side row and said second side row, each of said interior cell rows in generally parallel spaced apart relation to said first side row, said second side row and/or one of said interior cell rows and interconnected therewith by a plurality of said linking members.

8. The load bearing mat according to claim 1, wherein said connecting means comprises a plurality of interlocking members in corresponding relation with cooperatively configured adjacent connecting means on a peripheral edge of said adjacent mat unit.

9. The load bearing mat according to claim 8, wherein said plurality of interlocking members at said first side and said second side and at said first end and said second end are laterally disposed and alternatively comprise a plurality of selectively positioned projecting members and a plurality of selectively positioned open members, said open members configured to receive said projecting members in interlocking relation.

10. The load bearing mat according to claim 9, wherein each of said projecting members comprises a lateral snap lock and each of said open members comprises a lateral snap lock receiving member having a lateral snap lock receiving opening, said lateral snap lock and said lateral snap lock receiving member cooperatively configured to provide interlocking engagement between said mat unit and said adjacent mat unit.

11. The load bearing mat according to claim 9, wherein said projecting members and said open members are configured for generally horizontal engagement thereof.

12. The load bearing mat according to claim 8, wherein said plurality of interlocking members at said first side and said second side are configured to connect said mat unit to one or more cooperatively configured side disposed mat units and to permit rolling of said mat unit and said one or more side disposed units.

13. The load bearing mat according to claim 12, wherein said interlocking members at said first side of said mat unit comprises a lateral snap lock disposed on an elongated connecting strap and said interlocking members at said second side of said mat unit comprise a lateral snap lock receiving member having a lateral snap lock receiving opening, said lateral snap lock and said lateral snap lock receiving opening configured for interlocking engagement with cooperatively configured like adjacent connecting means on said one or more side disposed units.

14. The load bearing mat according to claim 8, wherein said plurality of interlocking members at said first end and said second end are configured to connect said mat unit to one or more cooperatively configured end disposed units and to secure said mat unit to said one or more end disposed units in a substantially abutting relation.

15. The load bearing mat according to claim 14, wherein said interlocking members at said first end of said mat unit comprises a lateral snap lock receiving member having a lateral snap lock receiving opening and said interlocking members at said second end of said mat unit comprises a lateral snap lock, said lateral snap lock and said lateral snap lock receiving opening configured for interlocking engagement with cooperatively configured like adjacent connecting means on said one or more end disposed units.

16. The load bearing mat according to claim 1, wherein said mat unit is configured to be at least substantially embedded into a turf area with one or more adjacent mat units to provide support for movement of vehicle or other load bearing traffic over said turf area and to facilitate the growth of turf through said mat unit and said adjacent mat units.

17. The load bearing mat according to claim 1, wherein said cell members are hexagonally shaped and comprise generally rigid sidewalls.

18. The load bearing mat according to claim 1, wherein said cell members are of generally uniform cross-sectional area and integrally molded from a thermoplastic material.

19. A load bearing mat, comprising:
a mat unit having a bottom surface, a top surface, a first side, an opposing second side, a first end and an opposing second end;
a plurality of spaced apart cell rows disposed in said mat unit, each of said plurality of cell rows having a plurality of generally tubular cell members, said plurality of cell members comprising a series of a first cell member and an adjoining second cell member, each of said cell members having one or more generally upstanding sidewalls forming a substantially open bottom opening at said bottom surface and a substantially open top opening at said top surface, each of said first cell members and said second cell members having a common sidewall, said plurality of cell rows comprising a first side row at said first side of said mat unit and a second side row at said second side of said mat unit;
a plurality of generally flexible linking members interconnecting said first side row and said second side row, said linking members configured to not intrude into the interior area of said tubular cell members and to allow said mat unit to be placed in a generally rolled condition; and
means at each of said first side, said second side, said first end and said second end for connecting said mat unit to one or more adjacent mat units, said connecting means configured for complimentary interlocking engagement of said mat unit with said one or more adjacent mat units.

20. The load bearing mat according to claim 19, wherein each of said second cell members are axially offset relative to each of said first cell members.

21. The load bearing mat according to claim 19, wherein said plurality of cell rows further comprises one or more interior cell rows disposed between said first side row and said second side row, each of said interior cell rows in generally parallel spaced apart relation to said first side row, said second side row and/or one of said interior cell rows and interconnected therewith by a plurality of said linking members.

22. The load bearing mat according to claim 19, wherein said connecting means comprises a plurality of interlocking members in corresponding relation with cooperatively configured adjacent connecting means on a peripheral edge of said adjacent mat unit.

23. The load bearing mat according to claim 22, wherein said plurality of interlocking members at said first side and said second side and at said first end and said second end are laterally disposed and alternatively comprise a plurality of selectively positioned projecting members and a plurality of selectively positioned open members, said open members configured to receive said projecting members in interlocking relation.

24. The load bearing mat according to claim 23, wherein each of said projecting members comprises a lateral snap lock and each of said open members comprises a lateral snap lock receiving member having a lateral snap lock receiving opening, said lateral snap lock and said lateral snap lock receiving member cooperatively configured to provide interlocking engagement between said mat unit and said adjacent mat unit.

25. The load bearing mat according to claim 23, wherein said projecting members and said open members are configured for generally horizontal engagement thereof.

26. The load bearing mat according to claim 22, wherein said plurality of interlocking members at said first side and said second side are configured to connect said mat unit to one or more cooperatively configured side disposed mat units and to permit rolling of said mat unit and said one or more side disposed units.

27. The load bearing mat according to claim 26, wherein said interlocking members at said first side of said mat unit comprises a lateral snap lock disposed on an elongated connecting strap and said interlocking members at said second side of said mat unit comprise a lateral snap lock receiving member having a lateral snap lock receiving opening, said lateral snap lock and said lateral snap lock receiving opening configured for interlocking engagement with cooperatively configured like adjacent connecting means on said one or more side disposed units.

28. The load bearing mat according to claim 22, wherein said plurality of interlocking members at said first end and said second end are configured to connect said mat unit to one or more cooperatively configured end disposed units and to secure said mat unit to said one or more end disposed units in a substantially abutting relation.

29. The load bearing mat according to claim 28, wherein said interlocking members at said first end of said mat unit comprises a lateral snap lock receiving member having a lateral snap lock receiving opening and said interlocking members at said second end of said mat unit comprises a lateral snap lock, said lateral snap lock and said lateral snap lock receiving opening configured for interlocking engagement with cooperatively configured like adjacent connecting means on said one or more end disposed units.

30. A load bearing mat, comprising:
a mat unit having a bottom surface, a top surface, a first side, an opposing second side, a first end and an opposing second end;
a plurality of spaced apart cell rows disposed in said mat unit, each of said plurality of cell rows having a plurality of generally tubular cell members, said plurality of cell members comprising a series of a first cell member and an adjoining second cell member, each of said cell members having one or more generally upstanding sidewalls forming a substantially open bottom opening at said bottom surface and a substantially open top opening at said top surface, each of said first cell members axially offset relative to each of said second cell members, said plurality of cell rows comprising a first side row at said first side of said mat unit, a second side row at said second side of said mat unit and one or more interior cell rows disposed between said first side row and said second side row;
a plurality of generally flexible linking members interconnecting said plurality of cell rows, said linking members configured to not intrude into the interior area of said tubular cell members and to allow said mat unit to be placed in a generally rolled condition; and
means at each of said first side, said second side, said first end and said second end for connecting said mat unit to one or more adjacent mat units, said connecting means configured for complimentary interlocking engagement of said mat unit with said one or more adjacent mat units.

31. The load bearing mat according to claim 30, wherein said connecting means comprises a plurality of interlocking members in corresponding relation with cooperatively configured adjacent connecting means on a peripheral edge of said adjacent mat unit.

32. The load bearing mat according to claim 31, wherein said plurality of interlocking members at said first side and said second side and at said first end and said second end are laterally disposed and alternatively comprise a plurality of selectively positioned projecting members and a plurality of selectively positioned open members, said open members configured to receive said projecting members in interlocking relation.

33. The load bearing mat according to claim 32, wherein each of said projecting members comprises a lateral snap lock and each of said open members comprises a lateral snap lock receiving member having a lateral snap lock receiving opening, said lateral snap lock and said lateral snap lock receiving member cooperatively configured to provide interlocking engagement between said mat unit and said adjacent mat unit.

34. The load bearing mat according to claim 32, wherein said projecting members and said open members are configured for generally horizontal engagement thereof.

35. The load bearing mat according to claim 31, wherein said plurality of interlocking members at said first side and said second side are configured to connect said mat unit to one or more cooperatively configured side disposed mat units and to permit rolling of said mat unit and said one or more side disposed units.

36. The load bearing mat according to claim 35, wherein said interlocking members at said first side of said mat unit comprises a lateral snap lock disposed on an elongated connecting strap and said interlocking members at said second side of said mat unit comprise a lateral snap lock receiving member having a lateral snap lock receiving opening, said lateral snap lock and said lateral snap lock receiving opening configured for interlocking engagement with cooperatively configured like adjacent connecting means on said one or more side disposed units.

37. The load bearing mat according to claim 31, wherein said plurality of interlocking members at said first end and said second end are configured to connect said mat unit to one or more cooperatively configured end disposed units and to secure said mat unit to said one or more end disposed units in a substantially abutting relation.

38. The load bearing mat according to claim 37, wherein said interlocking members at said first end of said mat unit comprises a lateral snap lock receiving member having a lateral snap lock receiving opening and said interlocking members at said second end of said mat unit comprises a lateral snap lock, said lateral snap lock and said lateral snap lock receiving opening configured for interlocking engagement with cooperatively configured like adjacent connecting means on said one or more end disposed units.

39. The load bearing mat according to claim 30, wherein each of said first cell members and said second cell members share a common sidewall.

* * * * *